(12) United States Patent
Itskovich

(10) Patent No.: US 8,004,282 B2
(45) Date of Patent: Aug. 23, 2011

(54) METHOD OF MEASURING AND IMAGING RXO (NEAR WELLBORE RESISTIVITY) USING TRANSIENT EM

(75) Inventor: Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 301 days.

(21) Appl. No.: 12/325,841

(22) Filed: Dec. 1, 2008

(65) Prior Publication Data

US 2010/0134111 A1 Jun. 3, 2010

(51) Int. Cl.
*G01V 3/18* (2006.01)
(52) U.S. Cl. .................................................. 324/324
(58) Field of Classification Search ........... 324/333–375
See application file for complete search history.

(56) References Cited

U.S. PATENT DOCUMENTS

| | | | | |
|---|---|---|---|---|
| 5,452,761 | A | * | 9/1995 | Beard et al. ............. 324/323 |
| 5,926,024 | A | * | 7/1999 | Blount et al. ............ 324/324 |
| 5,955,884 | A | * | 9/1999 | Payton et al. ............ 324/339 |
| 6,466,872 | B1 | * | 10/2002 | Kriegshauser et al. ....... 702/7 |
| 6,597,708 | B1 | | 7/2003 | Mauger et al. |
| 7,027,922 | B2 | * | 4/2006 | Bespalov et al. ............ 702/7 |
| 7,046,009 | B2 | * | 5/2006 | Itskovich ............... 324/338 |
| 2005/0092487 | A1 | | 5/2005 | Banning et al. |
| 2005/0093546 | A1 | | 5/2005 | Banning et al. |
| 2006/0038571 | A1 | | 2/2006 | Ostermeier et al. |
| 2006/0290354 | A1 | * | 12/2006 | Fredette et al. ........... 324/367 |

OTHER PUBLICATIONS

Banning et al.; "Imaging of a subsurface conductivity distribution using a time-domain electromagnetic borehole conveyed logging tool," SEG/San Antonio 2007 Annual Meeting; pp. 648-652.

* cited by examiner

*Primary Examiner* — Huy Phan
*Assistant Examiner* — Joshua Benitez
(74) *Attorney, Agent, or Firm* — Mossman Kumar & Tyler PC

(57) ABSTRACT

A transient electromagnetic wave is generated using an electromagnetic instrument in a borehole. An apparent resistivity is estimated using a received signal responsive to the generated wave and further used to estimate a resistivity property of a fluid in the borehole.

20 Claims, 5 Drawing Sheets

METHOD OF MEASURING AND IMAGING RXO (NEAR WELLBORE RESISTIVITY) USING TRANSIENT EM

BACKGROUND OF THE DISCLOSURE

1. Field of the Invention

The present disclosure is related to obtaining a resistivity parameter in a wellbore environment. In particular, the present disclosure is related to obtaining apparent resistivity curves indicative of resistivity in the borehole, invasion zone and formation.

2. Description of the Related Art

Electromagnetic induction resistivity instruments can be used to determine the electrical conductivity of earth formations surrounding a wellbore. An electromagnetic induction well logging instrument is described, for example, in U.S. Pat. No. 5,452,761 issued to Beard et al. The instrument described in the Beard '761 patent includes a transmitter coil and a plurality of receiver coils positioned at axially spaced apart locations along the instrument housing. An alternating current is passed through the transmitter coil. Voltages which are induced in the receiver coils as a result of alternating magnetic fields induced in the earth formations are then measured. The magnitude of certain phase components of the induced receiver voltages are related to the conductivity of the media surrounding the instrument.

The development of deep-looking electromagnetic tools has a long history. Such tools are used to achieve a variety of different objectives. Deep looking tools attempt to measure the reservoir properties between wells at distances ranging from tens to hundreds of meters (ultra-deep scale). There are single-well and cross-well approaches, most of which are rooted in the technologies of radar/seismic wave propagation physics. This group of tools is naturally limited by, among other things, their applicability to only high resistivity formations and the power available down-hole.

Multi-frequency focusing (MFF) is an efficient way of increasing depth of investigation for electromagnetic logging tools. It is being successfully used in wireline applications, for example, in processing and interpretation of multi-component measurement devices. An example of such a device is the 3DExplorer® (3DEX®) induction logging instrument of Baker Hughes. In the 3DEX® instrument, three transmitters are placed axially on a tool mandrel and induce magnetic fields in three mutually orthogonal spatial directions: x, y, and z). The z-axis is chosen to be along the longitudinal axis of the tool, and the x-axis and y-axis are mutually perpendicular directions lying in the plane transverse to the axis. Three receivers, $R_x$, $R_z$, and $R_y$, are aligned along the orthogonal system defined by the transmitters. Measurements can be made for the corresponding magnetic fields $H_{xx}$, $H_{zz}$, and $H_{yy}$ as well as cross-components, $H_{xy}$ and $H_{xz}$. 3DEX® is operable in single frequency or multiple frequency modes.

Obtaining resistivity measurements of signals emanating from the borehole, the invasion zone and the formation can be useful in determining resistivity of a bed formation. Short spacing induction is useful in obtaining the near field measurements. There are several factors that make it difficult to perform short spacing induction measurements during logging. The most significant factors are the tool standoff and the rugosity of the borehole wall. The first way to reduce the parasitic effects of these factors is through reduction of the operating frequency. Unfortunately, this generally leads to loss of the signal strength. An alternative way is based on the dual frequency (or even multi-frequency) measurements which may lead to an even higher degree of signal loss.

Therefore, there is a need to have a system that has improved immunity to the mentioned parasitic factors than the system based on frequency measurements. The present disclosure addresses this need.

SUMMARY OF THE DISCLOSURE

One embodiment of the disclosure is a method of estimating a property of an earth formation. The method includes changing a current through a transmitter on an electromagnetic instrument conveyed in a borehole and inducing a current in the formation; receiving a transient signal resulting from the induced current in at least one receiver; estimating an apparent resistivity of the earth formation from the received signal; and estimating from the apparent resistivity a resistivity property of a fluid in the borehole.

Another embodiment of the disclosure is an apparatus configured to estimate a property of an earth formation. The apparatus includes an electromagnetic instrument configured to be conveyed in a borehole in the earth formation; and at least one processor configured to: (A) change a current through a transmitter on the electromagnetic instrument and induce a signal in the formation; (B) estimate an apparent resistivity of the earth formation from a received signal resulting from the induced signal; and (C) estimate from the apparent resistivity a resistivity property of a fluid in the borehole.

Another embodiment of the disclosure is a computer-readable medium accessible to a processor. The computer-readable medium includes instructions which enable the processor to: estimate an apparent resistivity of an earth formation using a signal measured by an electromagnetic instrument in a borehole resulting from a change of a current through a transmitter on the electromagnetic instrument; and use the estimated apparent resistivity to estimate a resistivity property of a fluid in the borehole.

BRIEF DESCRIPTION OF THE DRAWINGS

The present disclosure is best understood with reference to the following figures in which like numerals refer to like elements and in which.

DETAILED DESCRIPTION OF THE DISCLOSURE

Figure 1:
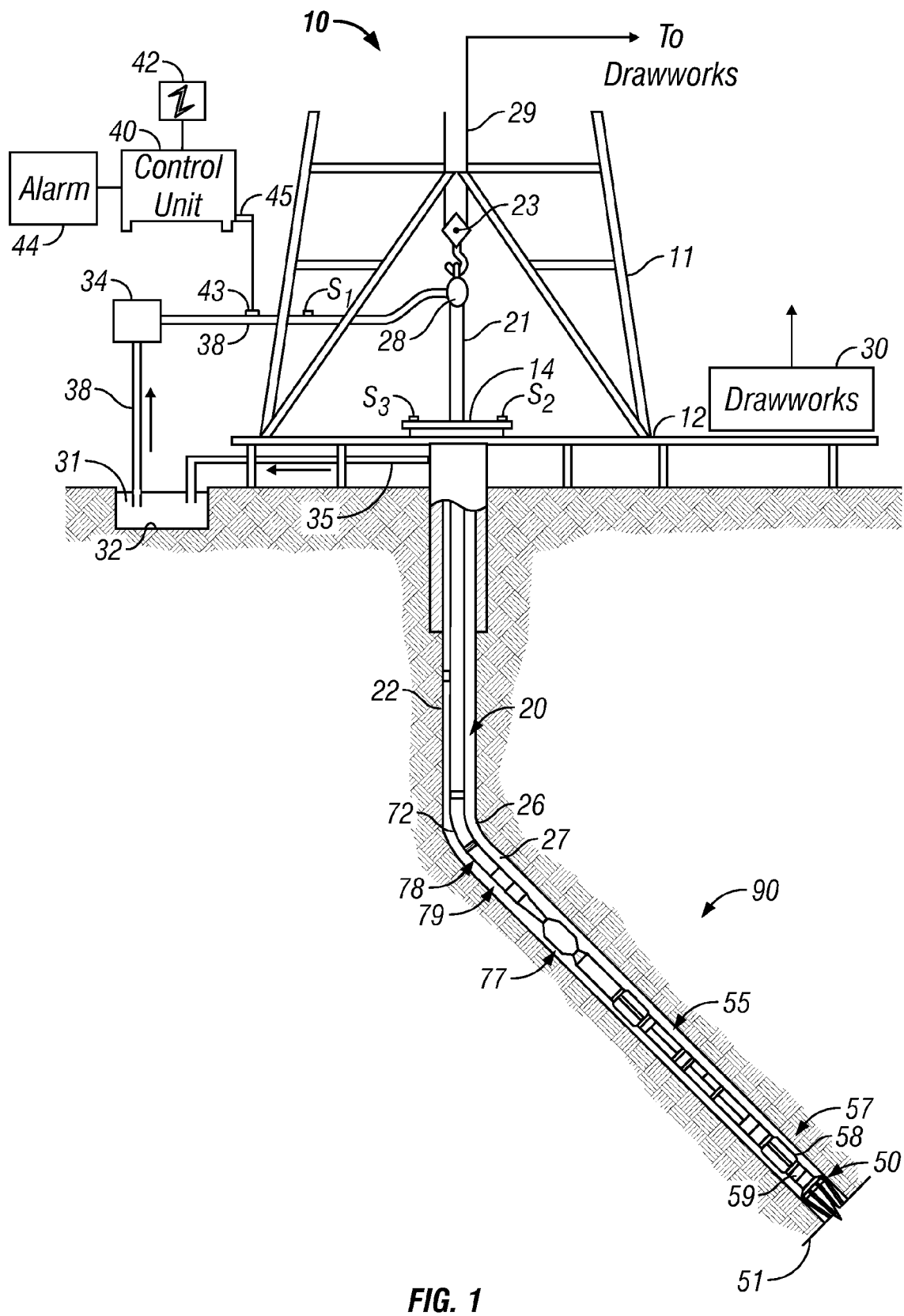
FIG. 1 (Prior Art) shows an induction logging instrument as it is typically used to make measurements suitable for use with the method of the invention.

FIG. 1 shows a schematic diagram of a drilling system 10 with a drillstring 20 carrying a drilling assembly 90 (also referred to as the bottom hole assembly, or "BHA") conveyed in a "wellbore" or "borehole" 26 for drilling the wellbore. The drilling system 10 includes a conventional derrick 11 erected on a floor 12 which supports a rotary table 14 that is rotated by a prime mover such as an electric motor (not shown) at a desired rotational speed. The drillstring 20 includes a tubing such as a drill pipe 22 or a coiled-tubing extending downward from the surface into the borehole 26. The drillstring 20 is pushed into the wellbore 26 when a drill pipe 22 is used as the tubing. For coiled-tubing applications, a tubing injector, such as an injector (not shown), however, is used to move the tubing from a source thereof, such as a reel (not shown), to the wellbore 26. The drill bit 50 attached to the end of the drillstring breaks up the geological formations when it is rotated to drill the borehole 26. If a drill pipe 22 is used, the drillstring 20 is coupled to a drawworks 30 via a Kelly joint 21, swivel 28, and line 29 through a pulley 23. During drilling operations, the drawworks 30 is operated to control the weight on bit, which is an important parameter that affects the rate of penetration. The operation of the drawworks is well known in the art and is thus not described in detail herein.

During drilling operations, a suitable drilling fluid 31 from a mud pit (source) 32 is circulated under pressure through a channel in the drillstring 20 by a mud pump 34. The drilling fluid passes from the mud pump 34 into the drillstring 20 via a desurger (not shown), fluid line 28 and Kelly joint 21. The drilling fluid 31 is discharged at the borehole bottom 51 through an opening in the drill bit 50. The drilling fluid 31 circulates uphole through the annular space 27 between the drillstring 20 and the borehole 26 and returns to the mud pit 32 via a return line 35. The drilling fluid acts to lubricate the drill bit 50 and to carry borehole cutting or chips away from the drill bit 50. A sensor $S_1$ placed in the line 38 provides information about the fluid flow rate. A surface torque sensor $S_2$ and a sensor $S_3$ associated with the drillstring 20 respectively provide information about the torque and rotational speed of the drillstring. Additionally, a sensor (not shown) associated with line 29 is used to provide the hook load of the drillstring 20.

In one embodiment of the disclosure, the drill bit 50 is rotated by only rotating the drill pipe 22. In another embodiment of the invention, a downhole motor 55 (mud motor) is disposed in the drilling assembly 90 to rotate the drill bit 50 and the drill pipe 22 is rotated usually to supplement the rotational power, if required, and to effect changes in the drilling direction.

In the exemplary embodiment of FIG. 1, the mud motor 55 is coupled to the drill bit 50 via a drive shaft (not shown) disposed in a bearing assembly 57. The mud motor rotates the drill bit 50 when the drilling fluid 31 passes through the mud motor 55 under pressure. The bearing assembly 57 supports the radial and axial forces of the drill bit. A stabilizer 58 coupled to the bearing assembly 57 acts as a centralizer for the lowermost portion of the mud motor assembly.

In one embodiment of the disclosure, a drilling sensor module 59 is placed near the drill bit 50. The drilling sensor module contains sensors, circuitry and processing software relating to the dynamic drilling parameters. Such parameters typically include bit bounce, stick-slip of the drilling assembly, backward rotation, torque, shocks, borehole and annulus pressure, acceleration measurements and other measurements of the drill bit condition. A suitable telemetry or communication sub 72 using, for example, two-way telemetry, is also provided as illustrated in the drilling assembly 90. The drilling sensor module processes the sensor information and transmits it to the surface control unit 40 via the telemetry system 72.

The communication sub 72, a power unit 78 and an MWD tool 79 are all connected in tandem with the drillstring 20. Flex subs, for example, are used in connecting the MWD tool 79 in the drilling assembly 90. Such subs and tools form the bottom hole drilling assembly 90 between the drillstring 20 and the drill bit 50. The drilling assembly 90 makes various measurements including the pulsed nuclear magnetic resonance measurements while the borehole 26 is being drilled. The communication sub 72 obtains the signals and measurements and transfers the signals, using two-way telemetry, for example, to be processed on the surface. Alternatively, the signals can be processed using a downhole processor in the drilling assembly 90.

The surface control unit or processor 40 also receives signals from other downhole sensors and devices and signals from sensors $S_1$-$S_3$ and other sensors used in the system 10 and processes such signals according to programmed instructions provided to the surface control unit 40. The surface control unit 40 displays desired drilling parameters and other information on a display/monitor 42 utilized by an operator to control the drilling operations. The surface control unit 40 typically includes a computer or a microprocessor-based processing system, memory for storing programs or models and data, a recorder for recording data, and other peripherals. The control unit 40 is typically adapted to activate alarms 44 when certain unsafe or undesirable operating conditions occur.

Figure 2A:
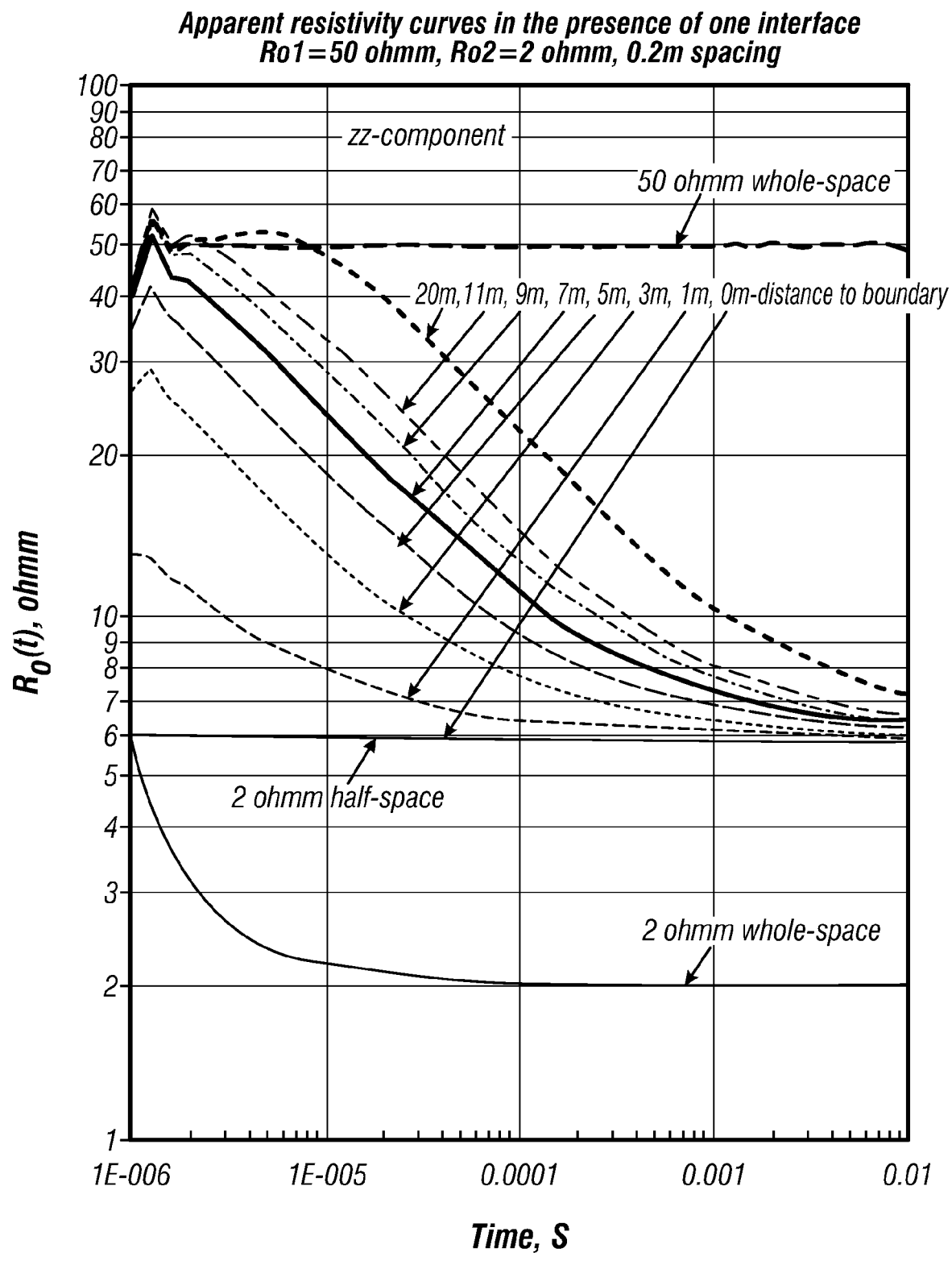
FIG. 2A shows typical apparent resistivity curves obtained from an induction logging tool in the presence of an interface.
Figure 2B:
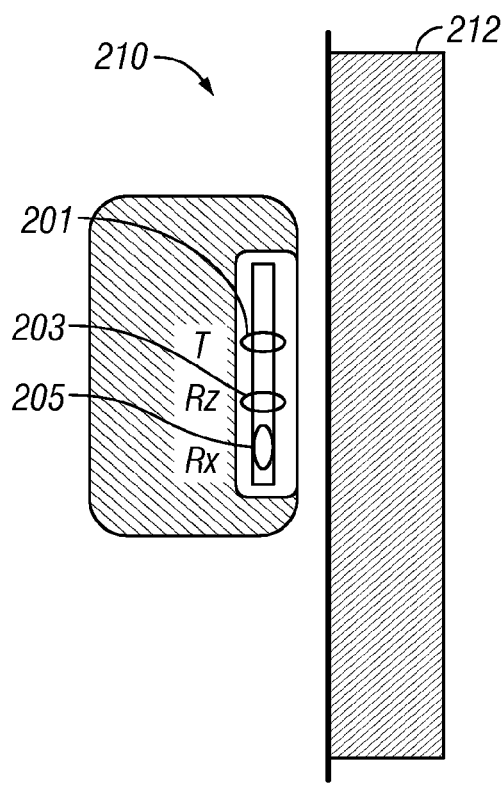
FIG. 2B shows an exemplary transmitter-receiver configuration of an exemplary induction logging tool.

FIG. 2A shows typical apparent resistivity curves obtained from an induction logging tool in the presence of an interface. FIG. 2B shows an exemplary transmitter-receiver configuration of an induction logging tool. Transmitter 201 is oriented along the z-axis (longitudinal axis of the tool). Receiver $R_z$ 203 is along the z-axis, parallel to the transmitter and receiver $R_x$ 205 is perpendicular to the longitudinal axis, facing along an x-axis. The exemplary curves of FIG. 2A are obtained using the $R_z$ 203 receiver. In one aspect, the transmitter 201 and receiver 203 are separated by 0.2 m. The logging tool is in a bed formation having resistivity of 50 Ω-m 210 and is near an interface of with a bed formation having resistivity of 2 Ω-m 212. The apparent resistivity curves show the results of the zz-component. The tail end of the transient response is indicative of $R_{xo}$ and is irrespective of the distance to the borehole wall. Typically, the transient signal is first converted to apparent resistivity. The shape of the apparent resistivity curve is affected by the distance to the interface, as seen in FIG. 2A. The apparent resistivity curves may be obtained in the presence of a conductive mud. In another aspect, the transmitter and $R_z$ coil may be the same coil.

Figure 3:
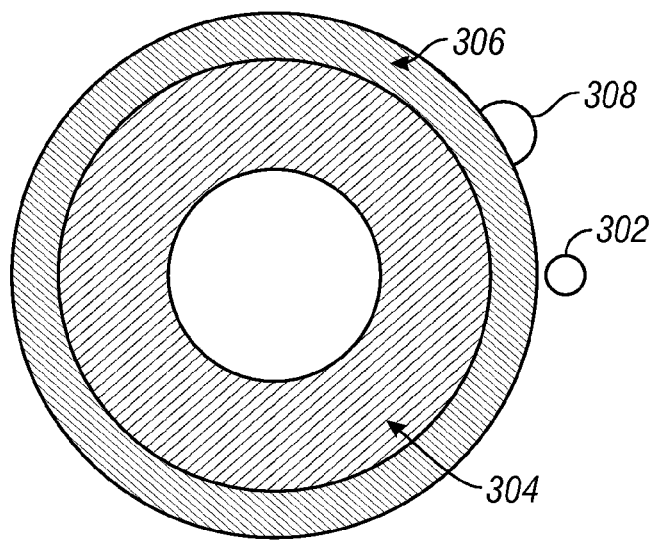
FIG. 3 shows a cross-sectional view of a collar of an exemplary induction logging tool.

FIG. 3 shows a cross-sectional view of a collar of an induction logging tool. In one aspect, loop antenna 302 is located on an exterior location of the drill collar 304. The conductivity of the drill collar adds complexity to the problem of obtaining a signal. In one aspect, ferrite 306 between collar 304 and antenna 302 may be used to suppress the effect of the collar on the signal. In addition, the loop antenna, such as antenna 308, may be partially embedded within the ferrite. Another method for compensating for the effect of the conductivity of the drill collar is described in U.S. Pat. No. 7,027,922, issued to Bespalov et al. and having the same assignee as the present disclosure and which is incorporated herein by reference.

Time Domain Electromagnetic Measurements (TDEM) are obtained when current is switched off in the transmitter loop and a transient signal is measured in the receiver loop placed at some distance from the receiver. The measured signal is converted into an apparent resistivity curve which may be indicative of the electrical parameters of at least one of the borehole, the invasion zone and the formation, depending on the time at which the transient signal is received.

In one aspect of the present disclosure, TDEM may be performed in the time frame of $(10^{-10}$-$10^{-6})$ seconds. Measured signals may be converted into apparent resistivity curves and information may be extracted indicative of a resistivity parameter of the borehole, invasion zone and formation. An inversion may be performed on the signal. The inversion may be used to define resistivity of geo-electrical parameters of the borehole, the invasion zone and the formation. Parameters determined from the apparent resistivity curve such as in FIG. 3 may be used as an initial guess for an inversion process.

Figure 4:
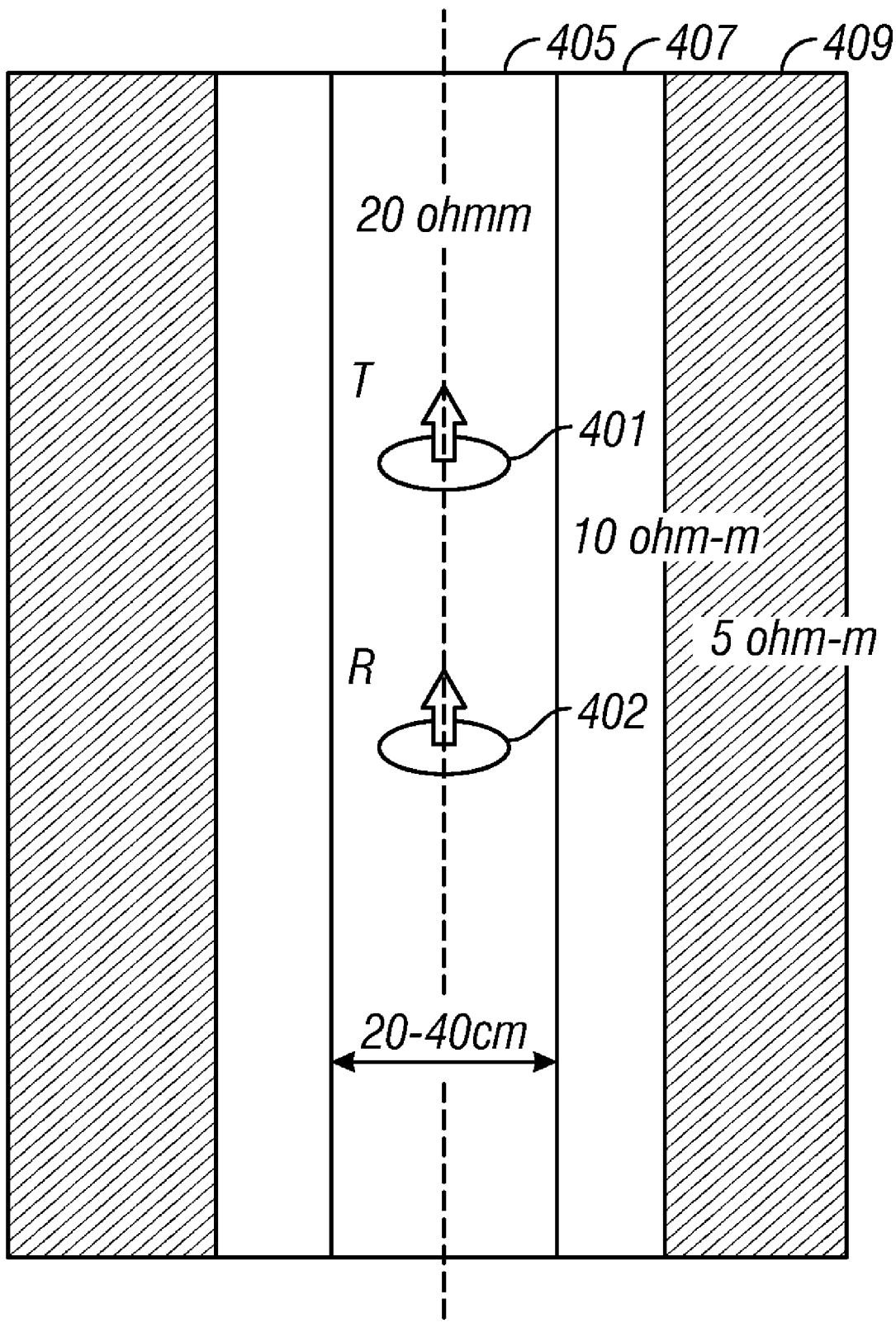
FIG. 4 shows a schematic of an exemplary induction logging tool disposed in a borehole penetrating a formation structure.

FIG. 4 shows a schematic of an exemplary tool disposed in a borehole penetrating a formation structure. The formation structure includes a borehole region 405, an invasion region 407 and a formation region 409. Each region has differing levels of mud present. Thus, each region displays its own resistivity. The TDEM system of the present disclosure includes a transmitter coil 401 with the moment $M_z$ parallel to the direction of the borehole and at least one set of receiving coils 402 oriented in both Z and X-directions. Measurements are taken while the tool is moving along the borehole trajectory. In one aspect, at a time t=0, current in the transmitter coil vanishes from an initial value of $I_0$ to 0, thereby inducing currents in the surrounding regions. The currents induced in the borehole and in the formation (eddy currents) diffuse from the region close to the transmitter coil in all the directions surrounding the transmitter. The currents in the vicinity of the borehole and in the formation induce electromagnetic field components that are subsequently measured at the receiving coil.

The time at which a signal is measured at the receiver coil is indicative of the distance it travels and hence of the region from which it originates. Thus, a signal measured at an early period originates in the borehole. A signal measured at a middle period originates in the invasion zone, and a signal measured at a late period originates in a formation. The measured signals can thus be used to determine properties of each region.

In the late stage of the transient process, the signal is mainly driven by the resistivity of the formation and can be expressed as:

$$\frac{dB_z}{dt} \approx \frac{M}{8\pi\sqrt{\pi}} \left(\frac{\mu}{t}\right)^{5/2} \frac{1}{\rho^{3/2}} \quad \text{Eq. (1)}$$

and the apparent resistivity is given by:

$$\rho(t) \approx \left(\frac{M}{8\pi\sqrt{\pi}} \cdot \frac{1}{\frac{dB_z}{dt}}\right)^{2/3} \left(\frac{\mu}{t}\right)^{5/3} \quad \text{Eq. (2)}$$

Figure 5:
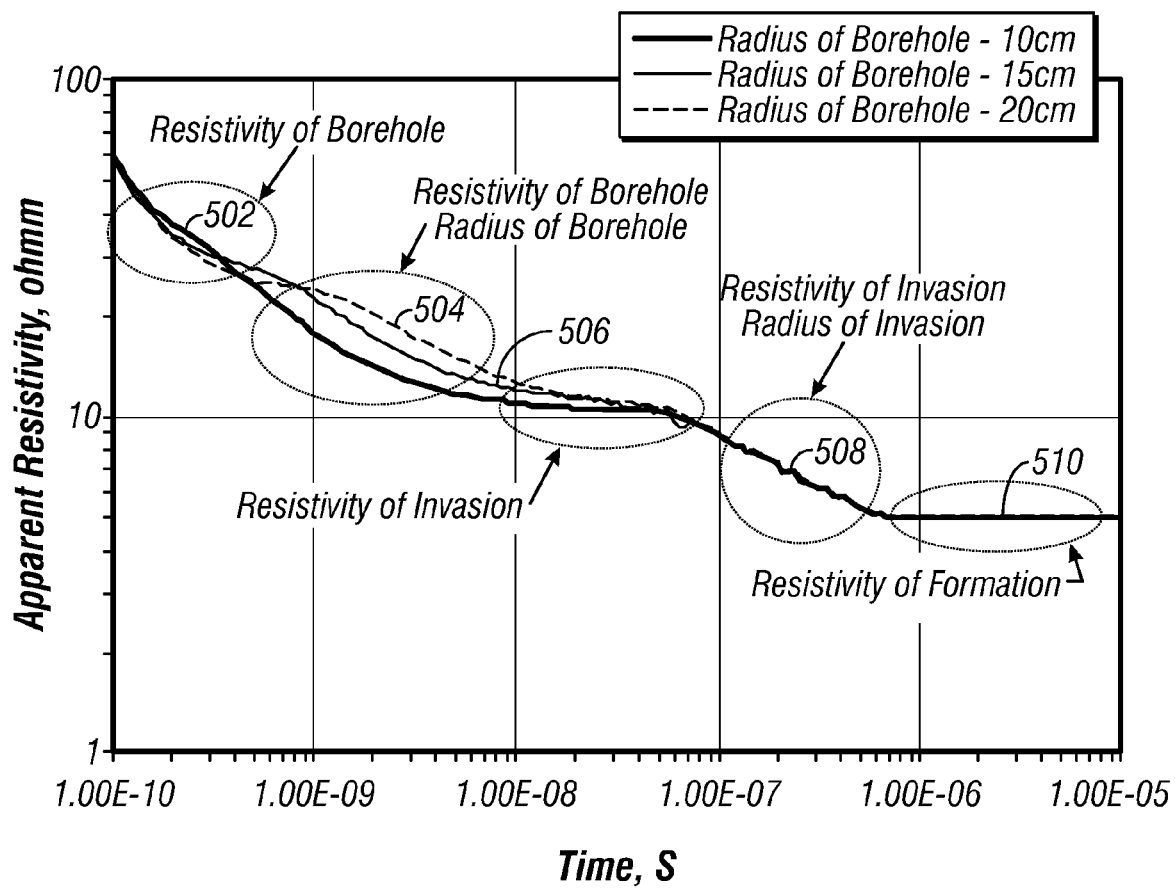
FIG. 5 shows exemplary apparent resistivity curves obtained from a borehole model in one aspect of the present disclosure.

Thus, the apparent resistivity depends on the ratio of the magnetic moment of the transmitter to a rate of change of the received signal. FIG. 5 shows exemplary apparent resistivity curves obtained from a borehole model. The modeling is performed for three borehole sizes of 10, 15 and 20 cm. The resistivity of the borehole is 20 Ω-m. The resistivity of the invasion zone is 10 Ω-m, while the resistivity of the formation is 5 ohm-m. The radius of the invasion zone is 1 m. The transmitting/receiving coil size is 1 cm, and transmitter-receiver spacing is 10 cm. Signals are obtained over a range from $10^{-10}$ seconds to $10^{-5}$ seconds. The dashed circles of FIG. 5 highlight the regions where the signal is mainly driven by certain parameters of the model. The apparent resistivity curves are very well representative of both resistivity of the invasion zone (10 ohm-m) and of the formation (5 ohm-m). The signal in the early stages $((1-5)*10^{-10}$ sec) 502 depends on the resistivity of the borehole, regardless of the borehole size. The signal in the time interval $((5-50)*10^{-10}$ sec) 504 shows strong dependence on both the borehole size and on its resistivity. The interval $((0.5-5)*10^{-8}$ sec) 506 contains information about resistivity of the invasion zone. The signal in the time interval $((0.1-1)*10^{-6}$ sec) 508 displays strong dependence on the size of the invasion zone and resistivity contrast between the invasion zone and the formation. At the late stage $(t>5*10^{-6}$ sec) 510, the transient signal depends on the resistivity of formation only. The apparent resistivity curve is very well representative of both resistivity of the invasion zone (10 ohm-m) and of the resistivity of the formation (5 ohm-m) regardless the size of the borehole. Thus the TDEM measurements are immune to the geometrical features of the borehole such as borehole size and rugosity.

The early stage of the apparent resistivity does not read the exact borehole resistivity, since the formula for it relies on the late stage (or near zone) approximation for the transient signal. Introducing an apparent resistivity via an exact expression for the transient signal in the homogeneous whole space improves the accuracy of the reading. Since the apparent resistivity provides just an approximate estimation for the parameters of borehole, invasion and formation, the inversion can be utilized to improve the accuracy of the parameters. In one aspect, apparent resistivity readings may serve as an initial guess for use in the inversion.

The disclosure has been described above with reference to a MWD apparatus carried on a drillstring. The method of the disclosure can also be used on other types of MWD apparatus conveyed on a drilling tubular, and may also be used on a logging tool carried on a wireline. The last such method is of relatively minor importance since on wireline devices, it is possible to have a housing of very high conductivity so that the correction methods described herein may not be necessary. Such means of conveyance would be known to those versed in the art and are not discussed further.

It will be appreciated by those skilled in the art that resistivity is the inverse of conductivity. Accordingly, any reference in this disclosure to resistivity should be considered to include disclosure as to conductivity inverted. Similarly, any reference in this disclosure to conductivity should be considered to include disclosure as to the resistivity inverted.

The processing of the data may be done with the use of a computer program implemented on a suitable computer-readable medium that enables the processor to perform the control and processing. The term processor as used in this application is used in its traditionally-broad sense and is intended to include such devices as single-core computers, multiple-core computers, distributed computing systems, field programmable gate arrays (FPGAs) and the like. The computer-readable medium referenced in this disclosure is any medium that may be read by a machine and may include magnetic media, RAM, ROM, EPROM, EAROM, flash memory and optical disks. In addition, results of the processing may be stored on a suitable medium. The processing may be done downhole or at the surface. In an alternative embodiment, part of the processing may be done downhole with the remainder conducted at the surface.

While the foregoing disclosure is directed to the exemplary embodiments of the invention, various modifications will be apparent to those skilled in the art. It is intended that all such variations within the scope and spirit of the appended claims be embraced by the foregoing disclosure.

What is claimed is:
1. A method of estimating a property of an earth formation, the method comprising:

changing a current through a transmitter on an electromagnetic instrument conveyed in a borehole and inducing a transient current in the formation;

receiving a transient signal resulting from the induced current in at least one receiver;

estimating an apparent resistivity of the earth formation from the received signal; and estimating from the apparent resistivity a resistivity property of a fluid in the borehole.

2. The method of claim 1 wherein estimating the resistivity property of the fluid in the borehole further comprises using the estimated apparent resistivity in a first time interval.

3. The method of claim 2 further comprising using the estimated apparent resistivity in a second time interval to estimate a size of the borehole.

4. The method of claim 1 further comprising using the estimated apparent resistivity in a third time interval to estimate at least one of: (i) a resistivity of an invasion zone proximate to the borehole, and (ii) a size property of an invasion zone proximate to the borehole.

5. The method of claim 1 further comprising using the apparent resistivity in a fourth time interval to estimate a resistivity property of the formation away from the borehole.

6. The method of claim 2 further comprising inverting the apparent resistivity over a time interval including the first time interval to estimate a resistivity property of the formation away from the borehole.

7. The method of claim 6 wherein estimating the resistivity property further comprises a distance to an interface in the earth formation having a resistivity contrast.

8. The method of claim 7 further comprising controlling a direction of drilling using the estimated distance to the interface.

9. The method of claim 1 wherein estimating the apparent resistivity further comprises using a ratio of a magnetic moment of the transmitter to a rate of change of the received signal.

10. An apparatus configured to estimate a property of an earth formation, the apparatus comprising:

an electromagnetic instrument configured to be conveyed in a borehole in the earth formation; and at least one processor configured to:
(A) change a current through a transmitter on the electromagnetic instrument and induce a transient signal in the formation;
(B) estimate an apparent resistivity of the earth formation from a received signal resulting from the induced signal; and
(C) estimate from the apparent resistivity a resistivity property of a fluid in the borehole.

11. The apparatus of claim 10 wherein the at least one processor is configured to estimate the resistivity property of the fluid in the borehole by using the estimated apparent resistivity in a first time interval.

12. The apparatus of claim 11 wherein the at least one processor is further configured to use the estimated apparent resistivity in a second time interval to estimate a size of the borehole.

13. The apparatus of claim 10 wherein the at least one processor is further configured to use the estimated apparent resistivity in a third time interval to estimate at least one of: (i) a resistivity of an invasion zone proximate to the borehole, and (ii) a size of an invasion zone proximate to the borehole.

14. The apparatus of claim 10 wherein the at least one processor is further configured to use the apparent resistivity in a fourth time interval to estimate a resistivity property of the formation away from the borehole.

15. The apparatus of claim 11 wherein the at least one processor is further configured to invert the apparent resistivity over a time interval including the first time interval to estimate a resistivity property of the formation away from the borehole.

16. The apparatus of claim 15 wherein the estimated resistivity property that the at least one processor is configured to estimate further comprises a distance to an interface in the earth formation having a resistivity contrast.

17. The apparatus of claim 16 wherein the at least one processor is further configured to control a direction of drilling using the estimated distance to the interface.

18. The apparatus of claim 10 further comprising a conveyance device configured to convey the instrument into the borehole, the conveyance device being selected from: (i) a drilling tubular, and (ii) a wireline.

19. A non-transitory computer-readable product having thereon instructions that when read by a processor causes the processor to perform a method, the method comprising:

estimate an apparent resistivity of an earth formation using a transient signal measured by an electromagnetic instrument in a borehole resulting from a change of a current through a transmitter on the electromagnetic instrument; and use the estimated apparent resistivity to estimate a resistivity property of a fluid in the borehole.

20. The non-transitory medium of claim 19 further comprising at least one of: (i) a magnetic medium, (ii) a RAM, (iii) a ROM, (iv) an EPROM, (v) an EAROM, vi) a flash memory, and (vi) an optical disk.

* * * * *